Dec. 21, 1937.  A. R. THOMPSON ET AL  2,102,765
FRUIT DIVIDING MECHANISM FOR FRUIT PREPARATION MACHINES
Filed Sept. 26, 1936  3 Sheets-Sheet 2
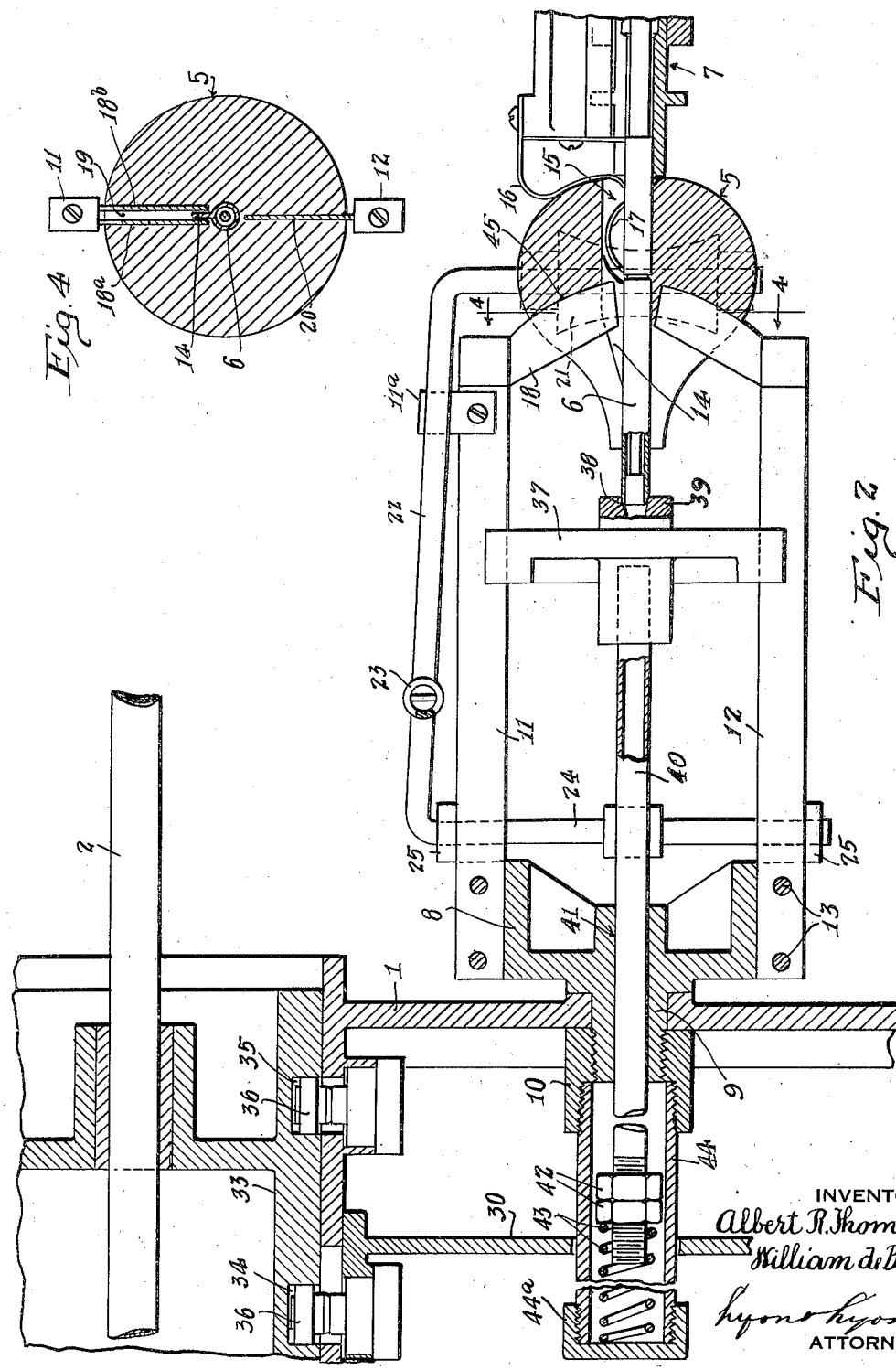
INVENTORS
Albert R. Thompson
William deBack
Lyon & Lyon
ATTORNEYS

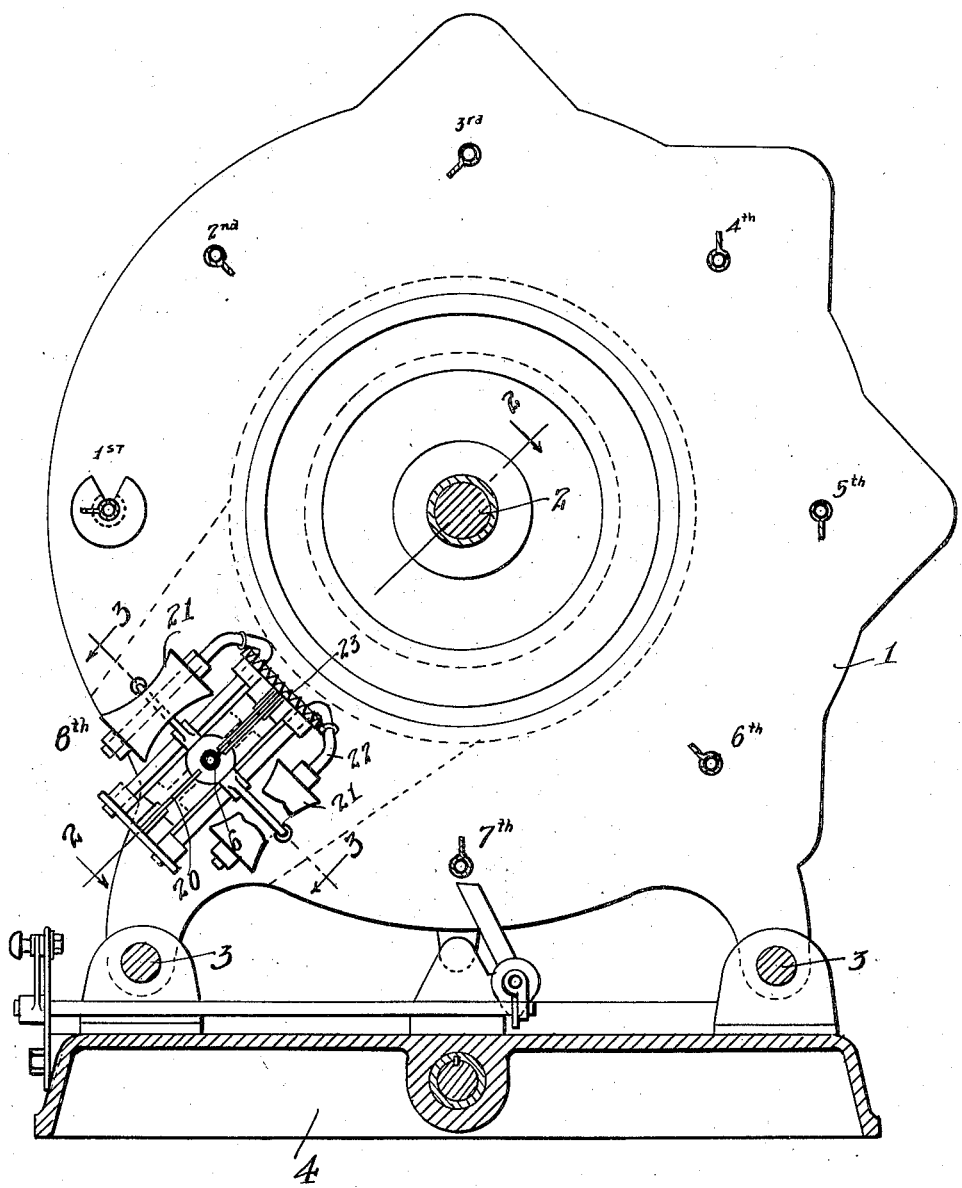

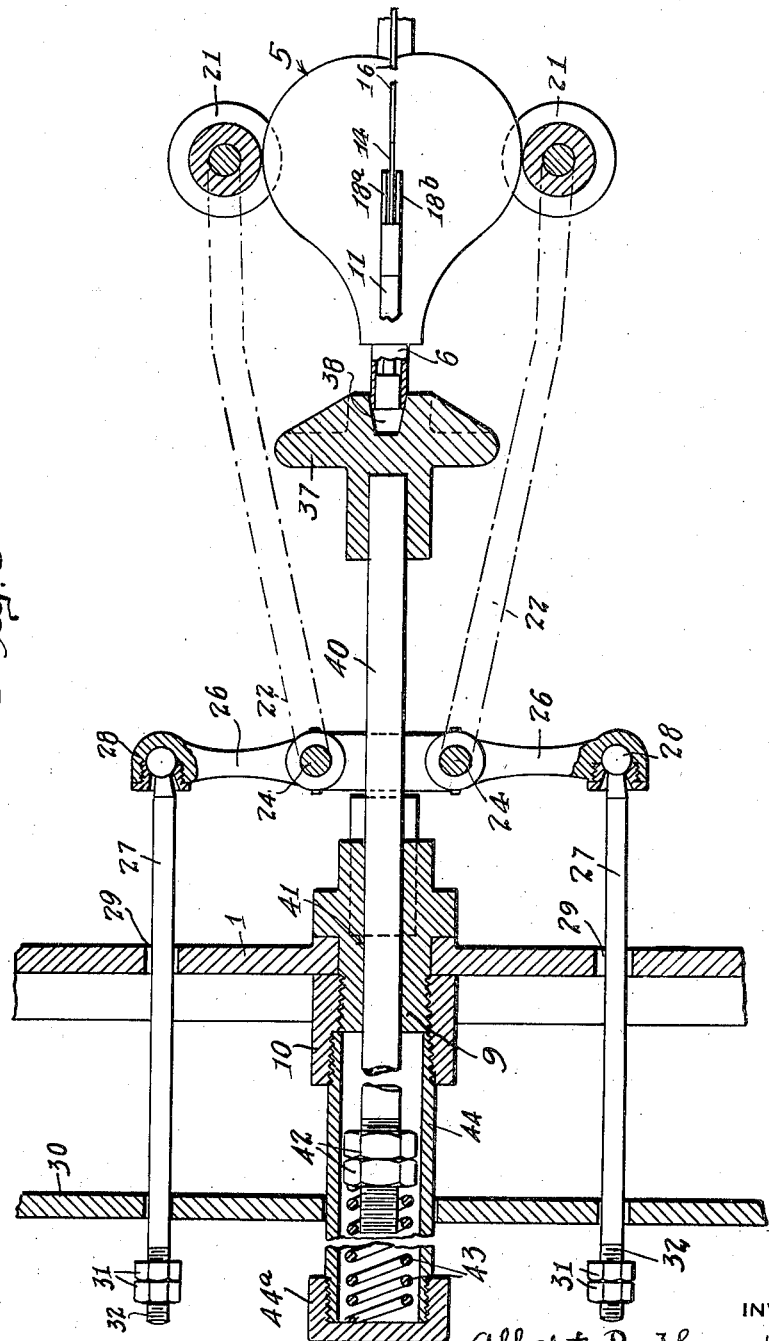

Patented Dec. 21, 1937

2,102,765

UNITED STATES PATENT OFFICE 2,102,765

FRUIT DIVIDING MECHANISM FOR FRUIT PREPARATION MACHINES

Albert R. Thompson, Los Gatos, Calif., and William de Back, Niagara Falls, N. Y.

Application September 26, 1936, Serial No. 102,760

5 Claims. (Cl. 146—33)

This invention relates to mechanism for preparing fruit or the like for drying or canning, and the invention is particularly applicable to the preparation of pears. The present application is to be regarded as a continuation in part of our prior application entitled "Pear preparation machine", filed April 27, 1931, Serial No. 533,048, now matured into Patent No. 2,056,413. In our former application the present invention was not set forth in the drawings with as much detail as in the present drawings and specification. Our prior application discloses rotary fruit peeling mechanism, and the construction employed involves the use of an impaling stem, or impaling tube, which impales the fruit on its longitudinal axis, and this impaling member is provided with a substantially radial projection for engaging the flesh of the fruit to prevent its rotation on the impaling member while the peeling devices are operating to remove the skin of the fruit.

The general object of the present invention is to provide simple means for dividing the fruit into sections in a radial plane, or planes, substantially passing through the axis of the fruit, and to construct the dividing mechanism in such a way that one of the division planes of the fruit will substantially coincide with the plane of the radial projection on the impaling member.

In the operation of dividing the fruit, one of the blades of the dividing means, of course, passes longitudinally of the fruit substantially in the plane of this radial projection, or fin, that projects from the side of the impaling member; and one of the objects of the present invention is to provide means for accurate alignment of this blade with the plane of the projecting fin.

In the preferred construction of the dividing means, two slightly spaced blades are provided, and in the operation of dividing fruit the radial projection or fin on the impaling member, is received in the space between the two blades. One of the objects of the present invention is to provide means for insuring accurate alignment of the impaling member with respect to the dividing means, so as to insure that the radial projection or fin on the impaling member will be properly aligned with the gap between the two blades referred to above.

Further objects of the invention will appear hereinafter.

The invention consists in the novel parts and combination of parts to be described hereinafter, all of which contribute to produce an efficient fruit dividing mechanism for fruit preparation machines.

A preferred embodiment of the invention is described in the following specification, while the broad scope of the invention is pointed out in the appended claims.

In the drawings:

Fig. 1 is a vertical cross section through a pear preparation machine embodying our invention, and in this view the mechanism of the machine not immediately related to the present invention is omitted. This view, however, illustrates the dividing mechanism embodying this invention, with certain parts broken away.

Fig. 2 is a section taken in the radial plane 2—2 of Fig. 1 upon an enlarged scale, and further illustrating details of the construction and mode of operation of our dividing mechanism, certain parts being broken away, and others broken away and shown partially in section.

Fig. 3 is a section taken about in the plane of the line 3—3 of Fig. 1 upon an enlarged scale, and further illustrating details of this dividing mechanism.

Fig. 4 is a section taken about on the line 4—4 of Fig. 2, passing through the fruit impaled on the impaling member, and also passing through the dividing knives and illustrating one embodiment or arrangement of such knives for dividing the fruit into sections.

While this dividing mechanism may be employed in machines of any specific construction, it is intended particularly to cooperate with a machine having the characteristics of that disclosed in our prior application referred to above. This machine involves the use of a head 1 in the form of an annular plate mounted in a substantially vertical plane transverse to the longitudinal axis of the machine and coaxial with the central shaft 2 of the machine. The said head 1 is guided near its lower edge on horizontal guide bars 3 when the head is reciprocated by means which will be described more fully hereinafter. The guide bars 3 are supported on the horizontal frame plate 4, and may be supported in any suitable manner at a convenient height above the floor.

In the operation of the machine the fruit, such as the pear 5, is supported on an impaling member preferably in the form of a stem or tube 6, which forms part of a spindle assembly 7. There are a number of these spindle assemblies 7, which are supported on a turret head not illustrated; and in the operation of the machine the turret head is rotated in a step-by-step movement so as to bring the spindle assembly 7 in succession to a plurality of stations as indicated by the abbreviations 1st, 2nd, 3rd, 4th, 5th, 6th, 7th, and 8th, in Fig. 1. The mechanisms located at the first station and the seventh station, and all intermediate stations, provide means for performing different operations upon the fruit, and the fruit finally arrives at the eighth station, at which point the fruit is divided into sections by the mechanism now to be described. This mechanism preferably includes a knife bracket 8 having a hub or neck 9 that is rigidly secured to the head 1 (see Fig. 2). In the present instance, this neck passes through an opening in the head 1, and the neck is threaded so as to receive a clamping nut 10 that secures the bracket rigidly to the head 1. The knife bracket 8 carries a plurality of knife arms for supporting blades or knives to divide the fruit. There may be as many of these knife arms as desired. In the present instance, however, we have illustrated two diametrically opposite knife arms 11 and 12, the inner ends of which are rigidly secured to the bracket 8 by suitable bolts 13. The impaling member 6 is provided with a radial projection preferably in the form of a thin fin 14; and in the operation of the machine, when a pear 5 is impaled on the stem 6, this fin 14 cuts a way 15 for itself in the flesh of the pear (see Fig. 2). Associated with the impaling member 6 there is a combination coring knife and flower end cutter 16, which includes the curved corer extension 17 located at the side of the tube 6. During the operation of preparing a pear, a relative rotation of the combination coring knife and flower end cutter, takes place, which cores the fruit and trims off the flower end. When the fruit arrives at the station 8, the coring knife is in alignment with the plane of the fin 14. The dividing means that divides the fruit into sections, includes a blade located substantially in the plane of the fin 14, and in the present instance this blade is carried by the knife arm 11. We prefer to employ a knife 18 secured to the arm 11 and comprising a pair of slightly spaced blades 18a and 18b. As indicated, these blades are spaced slightly apart so as to form a narrow gap 19 to receive the fin 14 when the relative movement takes place that effects the division of the fruit into sections. Any number of further blades can be provided to cooperate with the knife 18 to sever the fruit into sections. In the present instance, however, we provide a single blade 20 located diametrically opposite to the knife 18, and secured to the knife arm 12. In the operation of the machine, soon after the fruit arrives at the eighth station, the machine automatically advances the dividing mechanism to divide the fruit. In order to accomplish this, and to cooperate with the severing blades to hold the sections of fruit in position and prevent their falling before the dividing operation is completed, we provide presser means for pressing against the outer face of the fruit sections; and in the present instance this includes two oppositely disposed presser rollers 21, said rollers of course, having concave outer faces to enable them to conform approximately to the curvature of the cheek of the fruit. These rollers 21 are carried on a pair of oppositely disposed arms 22, which are yieldingly pulled toward each other by any suitable means, for example, a coil spring 23 connecting the arms (see Fig. 2). Each arm is formed preferably as an integral extension from a shaft 24 that is rotatably mounted in bearings 25 on the knife arms 11 and 12 (see Fig. 2).

When the dividing mechanism is at rest, the arms 22 are held apart in an inactive position. For this purpose the shaft 24 of each arm is provided with a lever 26, and each of these levers carries a pull rod 27 connected by a joint to the end of the same. In the present instance these joints may be ball and socket joints 28 as illustrated in Fig. 3. These pull rods 27 pass freely through openings 29 in the head 1, and extend back and through an auxiliary head 30 (see Figs. 2 and 3) back of which each pull rod is provided with a pair of nuts 31, one of which is a check nut for enabling these nuts to be locked in any adjustable position desired, on the threads 32 at the rear ends of the pull rods. The heads 1 and 30 are moved forward at the proper time automatically by the machine, through the medium of a central cam drum or cylinder 33 (see Fig. 2) the surface of which is provided with cam grooves 34 and 35 in which rollers 36 run, the said rollers being carried respectively by the heads 1 and 30. In the operation of the machine, when the dividing operation is about to take place, the cam groove 34 advances the head 30 with respect to the head 1 so as to permit the spring 23 to move the presser rollers 21 toward each other, and so that they will press yieldingly by spring pressure against the fruit, and in a plane in the present instance, substantially at right angles to the plane of the beveled knife 18. It is preferable that the advancing movement of this auxiliary head 30 should let the rollers 21 come in against the pear in a plane substantially coinciding with the plane of maximum diameter of the fruit. Soon after the auxiliary head 30 has commenced to advance, the head 1 also advances through the action of its cam groove 35, and this advances the dividing means so that its blades pass through the fruit.

Although the action of the spring 23 tends to center the fruit, we prefer to provide means for cooperating with the stem 6 to insure properly centering of the fruit, and to insure that the knife 18 will cooperate properly with the fin 14 and not engage with the fin in such a way as to interfere with the perfect operation of the dividing mechanism. For this purpose we prefer to provide a guide head 37 (see Fig. 2) which is guided at diametrically opposite points on the inner edges of the knife arms 11 and 12. This guide head is mounted so that it can yield, and operates to engage the end of the impaling stem 6. For this purpose the end of the impaling stem 6 is preferably slightly beveled so as to fit into the slightly tapered opening 38 formed in a projecting hub 39 on the forward side of the guide head. The guide head is carried on a stem 40, which extends back and slides freely through an opening 41 in the hub, or neck 9 of the knife bracket 8 beyond which it is threaded and provided with adjusting nuts 42 against which a coil spring 43 thrusts. The said spring may be housed if desired, in a tube 44 that extends back past the plane of the auxiliary head 30, and is provided with a cap 44a against which the rear end of the spring thrusts.

Fig. 2 shows the dividing operation at an intermediate stage. As the knife bracket 8 moves forwardly the knives 18 and 20, of course, cut through the flesh of the fruit, the thrust against the fruit being taken principally by the end trimming knife 16 which, if desired, may have greater width than the coring knife 17. The forward edges 45 of the knives 18 and 20 have a contour corresponding to the contour of the trimming blade 16 (see Fig. 2) so that when they arrive at the limit of their movement they will have substantially divided the fruit into sections.

The construction and mode of operation of the spindle assembly 7 is fully disclosed in our former application referred to above.

If desired, stops 11a may be provided on the knife arm 11 to limit the inward swinging movement of the roller arms 22 (see Fig. 2). These stops, however, must permit the rollers to reach the smallest pears prepared in the machine.

It should be understood that in our prior application referred to above, the complete mechanism of the assembly 7 is fully illustrated, and its mode of operation described; also that in the operation of the pear peeler described in our prior application, when the assembly 7 arrives at station 8, the impaling stem 6 is positively held in a relation such that the fin 14 will be held in a certain definite position with reference to the dividing or slicing means. In that machine, and in the present instance, this fin projects radially inward toward the axis of the shaft 2 of the machine, and in line with the gap between the blades of the double knife. In the slicing operation the cam groove 34 advances the auxiliary head 30, thereby permitting the pull rods 27 to move forward freely. Hence they will not interfere with the springs 23 in putting the presser rollers against the sides of the pear.

It is understood that the embodiment of the invention described herein is only one of the many embodiments this invention may take, and we do not wish to be limited in the practice of the invention, nor in the claims, to the particular embodiment set forth.

What we claim is:

1. A pear preparation machine including an impaling member in the form of a stem for impaling and supporting the pear along the axis of the pear, said impaling member having a projection adapted to cut into the flesh of the pear to maintain the same from rotation relative to the impaling member, halving blades, and means for effecting relative movement of the halving blades and the impaling member, with the projection in such relation that the halving blades sever the pear into halves in a plane substantially aligning with the cut formed by the said projection.

2. In a fruit peeling machine, the combination of an impaling member for impaling the fruit substantially on its axis, said impaling member having a substantially radial projection for engaging the fruit to hold the same against rotation on the impaling member, dividing means for dividing the fruit into sections and including a blade located substantially in the plane of said projection; and means for effecting a relative movement of the dividing means with respect to the impaling member carrying the fruit to effect the division of the fruit.

3. In a fruit peeling machine, the combination of an impaling member for impaling the fruit on the axis of the fruit and supporting the same, said impaling member having a substantially radial projection for engaging the flesh of the fruit to prevent relative rotation of the fruit, and means for dividing the fruit into sections in planes extending substantially radially from the axis of the impaling member, said dividing means and said impaling member being relatively movable toward and from each other, and one of said planes of division substantially coinciding with the plane of said projection.

4. In a fruit peeling machine, the combination of an impaling stem to impale the fruit with the axis of the stem substantially coinciding with the longitudinal axis of the fruit, said impaling member having a substantially radial projection projecting into the flesh of the fruit at the side of said stem to prevent relative rotation of the fruit, means including a plurality of blades for dividing the fruit into sections in planes extending substantially radially from the axis of the impaling member, one of said blades lying substantially in the plane of said radial projection; and means for effecting a relative movement of the dividing means and the impaling stem carrying the fruit to effect the division of the fruit.

5. In a fruit peeling machine, the combination of an impaling stem to impale the fruit with the axis of the stem substantially coinciding with the longitudinal axis of the fruit, said impaling member having a substantially radial projection projecting into the flesh of the fruit at the side of said stem to prevent relative rotation of the fruit, a knife frame, a plurality of blades carried by the knife frame for dividing the fruit into sections in planes extending substantially radially from the axis of the impaling member, one of said blades lying substantially in the plane of said radial projection, means for effecting a relative movement of the knife frame and the fruit, to pass the blades through the fruit and divide the same, and yielding means associated with the knife frame for engaging the end of the impaling member and for centering the same while the blades are dividing the fruit.

ALBERT R. THOMPSON.
WILLIAM DE BACK.